United States Patent [19]

Basciano

[11] Patent Number: 5,335,363
[45] Date of Patent: Aug. 2, 1994

[54] SIGNAL INTERFERENCE REDUCTION DEVICE AND METHOD

[75] Inventor: Nicholas J. Basciano, Millersville, Md.

[73] Assignee: Arinc Research Corporation, Annapolis, Md.

[21] Appl. No.: 814,470

[22] Filed: Dec. 30, 1991

[51] Int. Cl.$^5$ .............................................. H04B 1/38
[52] U.S. Cl. ....................................... 455/73; 455/91; 455/307; 333/126; 333/129; 333/135
[58] Field of Search .................. 455/50.1, 63, 73, 115, 455/303, 306, 307, 91, 129; 333/124, 125, 126, 129, 135–136

[56] References Cited

U.S. PATENT DOCUMENTS

| 2,590,373 | 3/1952 | Bradley | 333/126 |
|---|---|---|---|
| 3,988,679 | 10/1976 | clarke et al. | 455/306 |
| 4,168,479 | 9/1979 | Rubin | 333/126 |
| 4,291,286 | 9/1981 | Wagner | 333/166 |
| 4,751,744 | 6/1988 | Pavio, Jr. | 455/333 |
| 4,931,743 | 6/1990 | Fukuda et al. | 455/306 |
| 4,963,945 | 10/1990 | Cooper et al. | 455/307 |
| 4,972,455 | 11/1990 | Phillips et al. | 455/76 |

FOREIGN PATENT DOCUMENTS

| 58-201423 | 11/1983 | Japan . |
| 60-235510 | 11/1985 | Japan . |
| 2-152313 | 6/1990 | Japan . |

OTHER PUBLICATIONS

Nguyen et al., "W–Band Wideband Low Loss Planar Integrated Circuit Diplexer", *Microwave Journal*, Jul. 1985; pp. 157–161.

*Primary Examiner*—Reinhard J. Eisenzopf
*Assistant Examiner*—Andrew Faile

*Attorney, Agent, or Firm*—Oliff & Berridge

[57] ABSTRACT

This invention provides for separating undesired signals from spectra of desired signals in a communication system. Specifically, a communication system for transmitting and receiving spectra of signals having undesired signals and desired signals comprising: a transceiver system; a TEE-junction coupled to the transceiver system and having first and second ports, the undesired and desired signals being separated at the TEE-junction; an Off-line signal interference reduction device coupled to the first port, the Off-line signal interference reduction device receiving the undesired signals from the first port; and an In-line signal interference reduction device coupled to the second port and an antenna system. The Off-line signal interference reduction device connected to the TEE-junction of the communication system for shunting undesired signals included: a SIRD switch coupled to the TEE-junction for selectively coupling the Off-line signal interference reduction device; a main load coupled to a ground for dissipating the undesired signals; and a filtering system coupled between the SIRD switch and the main load. The In-line interference reduction device comprises: a first SIRD switch having first and second terminals and coupled to the TEE-junction; a second SIRD switch having first and second terminals and coupled to the antenna system; a filtering system having a plurality of filtering channels connected between the first and second SIRD switches; and a signal line connected between the first terminals of the first and second SIRD switches, wherein the filtering system is connected between the second terminals of the first and second SIRD switches, the SIRD switches for selectively bypassing the filtering system by coupling the TEE-junction and the antenna through the signal line.

28 Claims, 4 Drawing Sheets

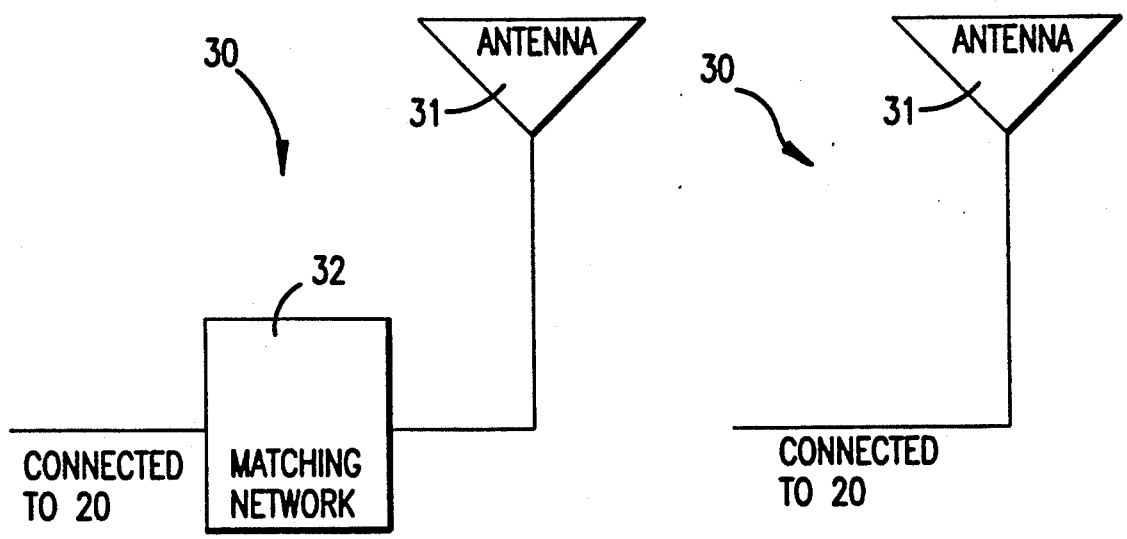
FIG.3A
FIG.3B
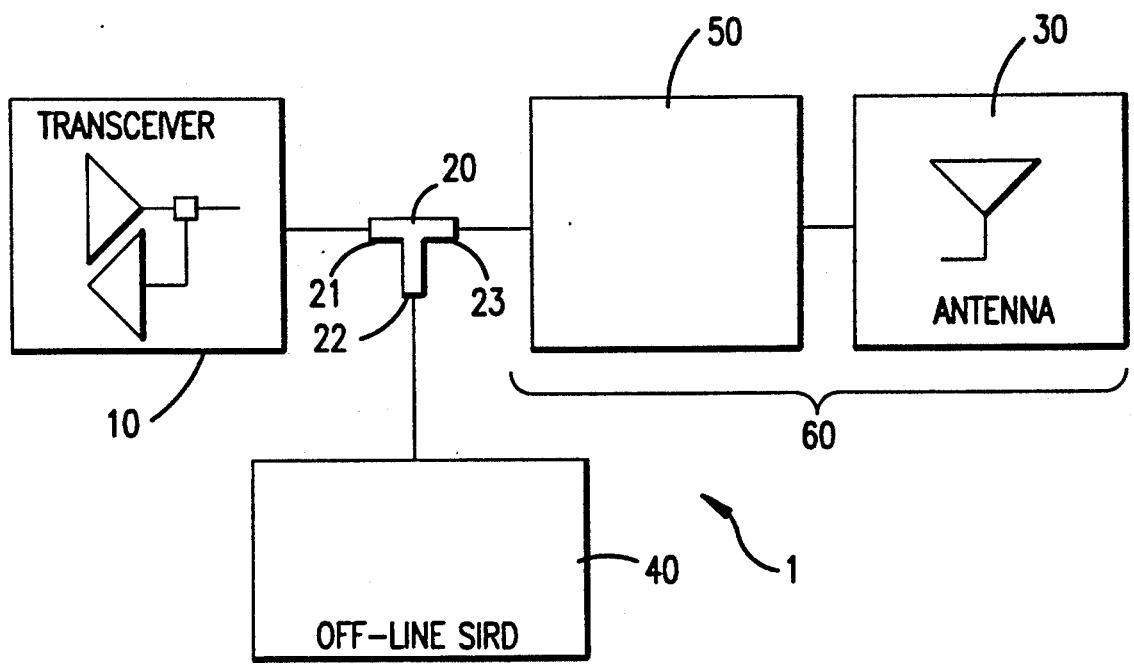
FIG.5

SIGNAL INTERFERENCE REDUCTION DEVICE AND METHOD

BACKGROUND OF THE INVENTION

1. Field of the Invention

The present invention is directed to a method and a device for separating undesired and desired signals and for dissipating the undesired signals and in particular to a method and a device having Off-line and In-line signal interference reduction device (SIRD) in communication systems, such as RF, IF, data, and voice communication systems, where undesired signals degrade the performance.

2. Description of Related Art

In communication systems, filters have been used to eliminate undesired signals such as interferences from the communication system. In every case, the related art sends both the desired and undesired signals through a filtering system to eliminate the undesired signals. Since the desired signals are sent through the filtering system, insertion losses due to the switches and the resistive, capacitive, and inductive loads of the filtering system weaken the desired signals.

Japanese Kokai 58-201423 to Haruyama discloses a comb-line filtering system to eliminate white noise and impulse noise in a sound signal system. The comb-line filtering system consists of a splitter, switches and resistors. In Haruyama's communication system, both the undesired and desired signals pass through the filtering system. The filtering system eliminates the undesired signals. The desired signal is summed up by the amplifier. Because the desired and undesired signals need to go through the filtering system, the desired signal is effected by insertion losses.

U.S. Patent No. 4,963,945 to Cooper et al disclose a band rejection filtering arrangement using bandpass filters, each terminated by a matched load. A quadrature hybrid circuit device divides the input signals and applies them to the bandpass filters. Signals within the rejection band are dissipated by the filters and matched loads, whereas desired signals are reflected. The reflected signals are then combined by the quadrature hybrid circuit to provide the band rejected output. This arrangement is made switchable between an all pass mode and the band rejection mode by providing PIN diodes between the quadrature hybrid circuit and the bandpass filters.

U.S. Pat. No. 3,788,674 discloses a filtering system for attenuating narrow band interference. The systems comprises: a broadband power splitter; a plurality of narrowband filters; a plurality of linear amplifiers, detectors and noise correlators connected to corresponding narrowband filters; and output switches connected to the linear amplifier to send the filtered signals into an adder. Both the undesired and desired signals are sent through the filtering system.

None of the above-identified references discloses a communication system having Off-line and In-line interference reduction devices for separating desired signals and undesired signals into different paths. Furthermore, none of the above-identified references disclose an Off-line signal interference reduction device connected to a TEE-junction of the communication system for shunting the undesired signals. Moreover, none of the above-identified references discloses an In-line signal interference reduction device coupled between the TEE-junction and the antenna system of the communication system for selectively filtering the desired signals.

All the references cited in the specification, and their references, are incorporated by reference herein where appropriate for appropriate teachings of additional or alternative details, features, and/or technical background.

OBJECTS AND SUMMARY OF THE INVENTION

It is an object of the present invention to provide a method and a device for solving the problems of the prior art.

It is another object of the present invention to provide a method and a device for sending desired signals through a communication system.

It is another object of the present invention to provide a method and a device for separating undesired signals and desired signals into separate impedance paths at a TEE-junction of a communication system.

It is a further object of the present invention to provide a method and a device for dissipating the undesired signals into a main load.

It is another object of the present invention to provide a method and a device for selectively filtering the desired signals.

It is another object of the present invention to provide a method and a device for providing broadband instantaneous multi-signal capabilities with reduced resultant intermodulation, harmonic and spurious signal products.

It is another object of the present invention to provide a method and a device for allowing collocated receivers to operate from the fundamental signals by eliminating the undesired signals.

It is a further object of the present invention to provide a method and a device for reducing or eliminating unintentional interference to adjacent channel communication systems.

To achieve the foregoing and other objects, and to overcome the shortcomings discussed above, a communication system for transmitting spectra of signals having undesired signals and desired signals in accordance with the present invention includes: a transceiver system; a TEE-junction coupled to the transceiver system and having first and second ports, the undesired and desired signals being separated at the TEE-junction; an Off-line signal interference reduction device coupled to the first port, the Off-line signal interference reduction device receiving and dissipating the undesired signal from the first port; and an Interface system coupled to the second port.

Furthermore, in accordance with the present invention, the Off-line signal interference reduction device connected to the TEE-junction of the communication system for shunting undesired signals includes: a SIRD switch coupled to the TEE-junction for selectively coupling the Off-line signal interference reduction device; a main load coupled to a ground for dissipating the undesired signals; and a filtering system coupled between the SIRD switch and the main load.

Moreover, the present invention provides an Interface system comprising an In-line signal interference reduction device coupled to the second port and an antenna system coupled to the In-line signal interference reduction device. The In-line signal interference reduction device coupled between the TEE-junction and an antenna system of a communication system for filtering desired signals comprises: a first SIRD switch having first and second terminals and coupled to the TEE-junction; a second SIRD switch having first and second terminals and coupled to the antenna system; a filtering system having a plurality of filtering channels connected between the first and second SIRD switches; and a signal line connected between the first terminals of the first and second SIRD switches, wherein the filtering system is connected between the second terminals of the first and second SIRD switches, the SIRD switches for selectively bypassing the filtering system by coupling the TEE-junction and the antenna through the signal line.

Additionally, a method in accordance with the present invention for separating and eliminating undesired signals in a communication system comprises the steps of: separating the undesired signals and desired signals into separate impedance paths; and dissipating the undesired signals.

BRIEF DESCRIPTION OF THE DRAWINGS

The invention will be described in detail with reference to the following drawings in which like reference numerals refer to like elements and wherein.

Figure 1:
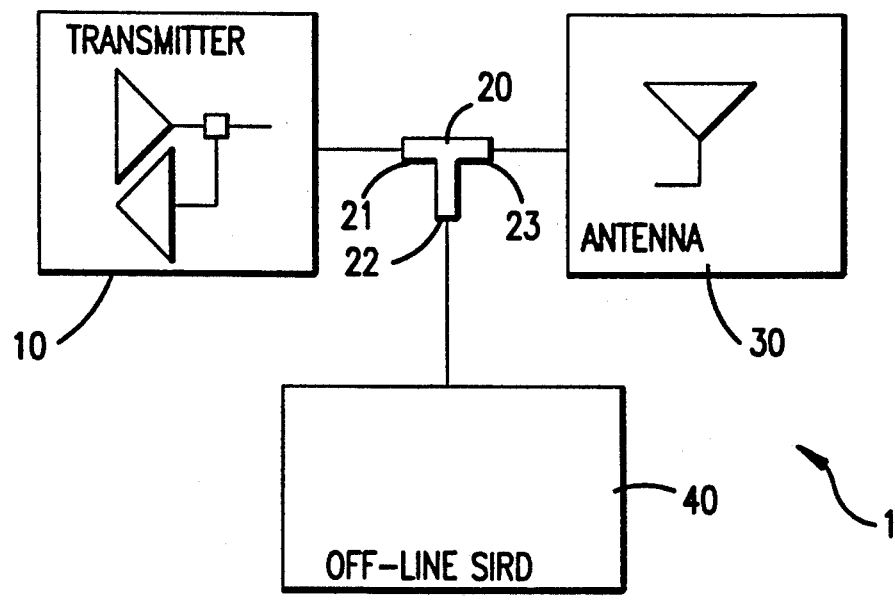
FIG. 1 is a schematic representation of the first embodiment of the RF communication system having an Off-line signal reduction device (SIRD)
Figure 4:
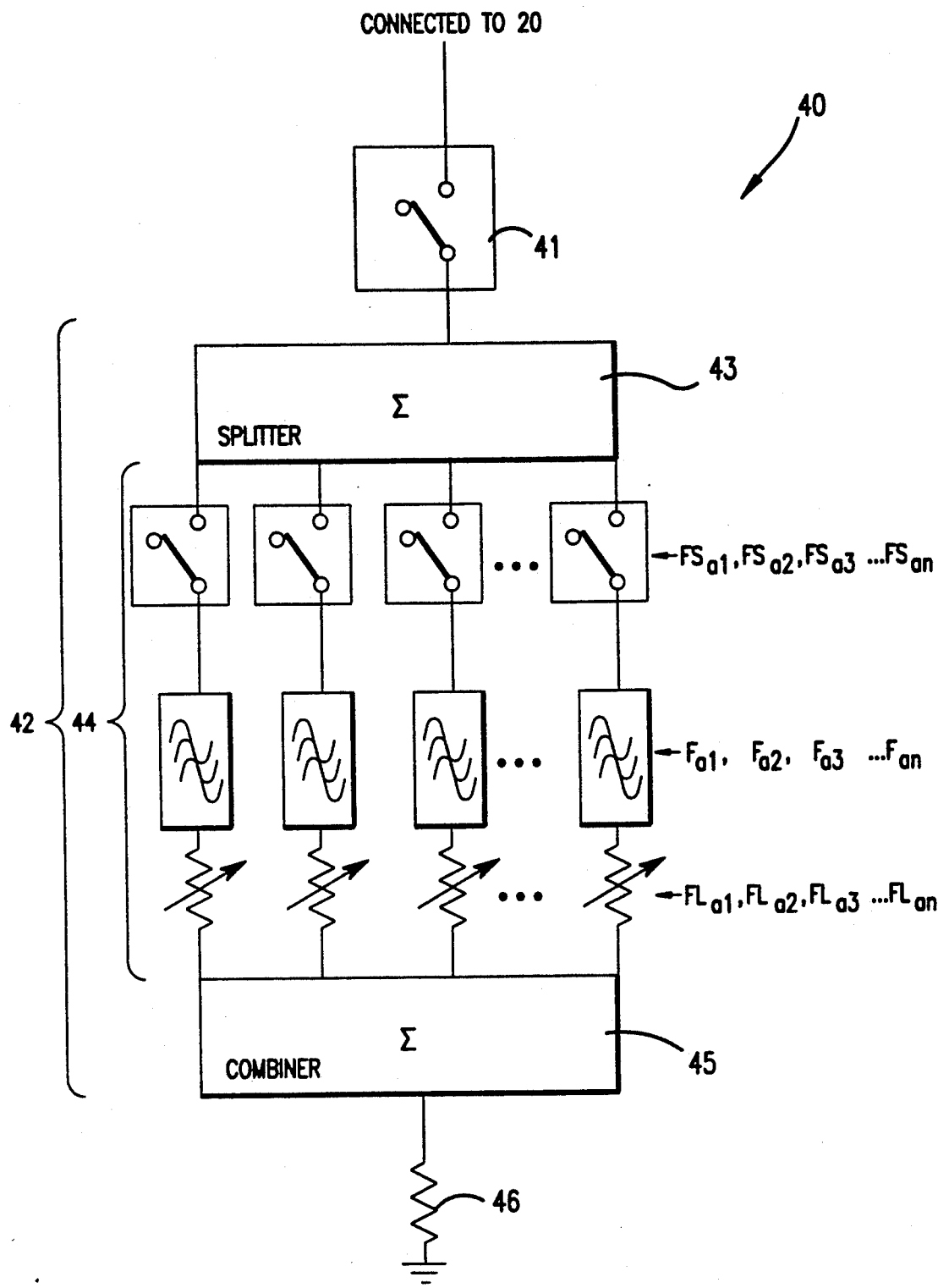
Figure 6:
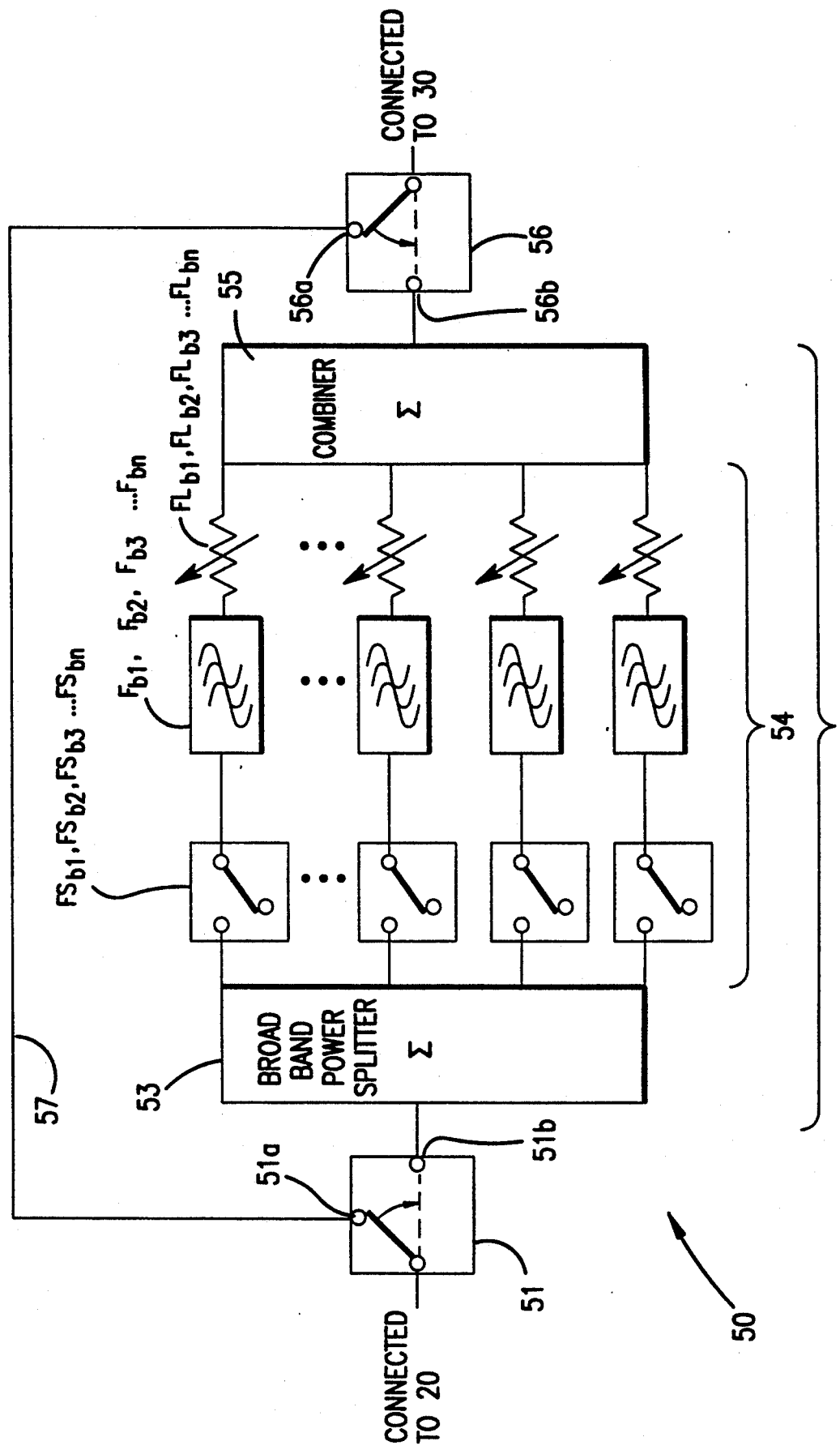

FIGS. and 3A and 3B are schematics of alternative configurations of the antenna system in FIG. 1;

FIG. 4 is a schematic of the Off-line signal interference reduction device shown in FIG. 1;

FIG. 5 is a schematic representation of the second embodiment RF communication system having Off-line and In-line signal interference reduction devices; and FIG. 6 is a schematic of the In-line signal interference reduction device shown in FIG. 5.

DETAILED DESCRIPTION OF THE PREFERRED EMBODIMENT

FIG. 1 shows a RF communication system 1 having an Off-line signal interference reduction device (SIRD) 40. The transceiver system 10 is connected to the input port 21 of the TEE-junction 20. The first port 22 is connected to the Off-line SIRD 40. The antenna system 30 is connected to a second port 23 of the TEE-junction 20.

Figure 2A:
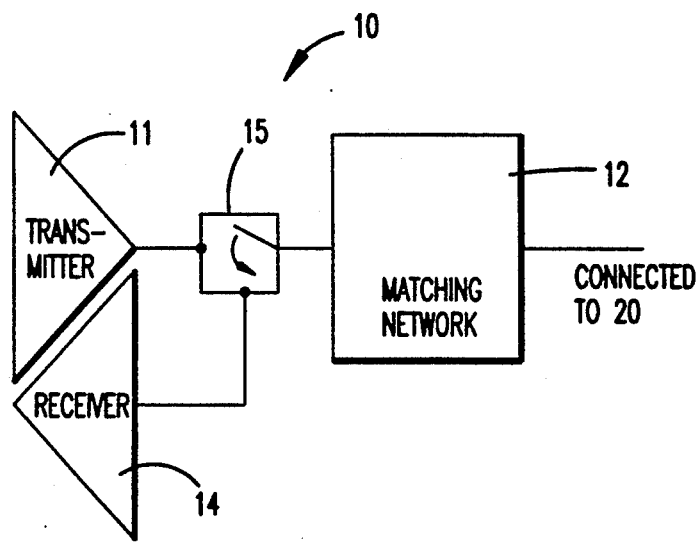
FIGS. 2A and 2B are schematics of alternative embodiments of the transceiver system of FIG. 1.
Figure 2B:
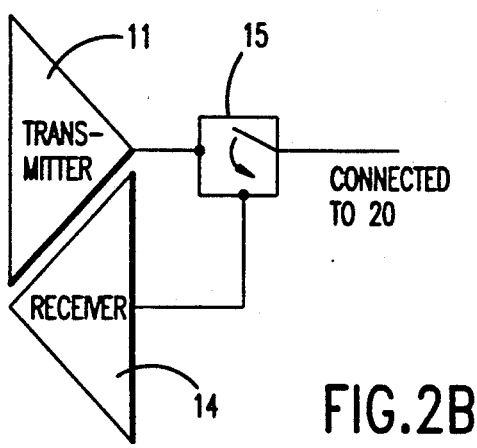

FIGS. 2A and 2B disclose alternative configurations of the transceiver system 10. In FIG. 2A, a transmitter amplifier 11 and a receiver amplifier 14 are coupled to a switch 15. The switch 15 is used to enable the transmitter or the receiver depending on whether the communication system is in a transmitting mode or a receiving mode. The switch 15 is connected to a matching network 12 and the matching network is connected to the input port 21 of TEE 20 (FIG. 1). The matching network 12 is used to match the input and output impedances of transmitter 11 and receiver 14 to the impedances at the TEE-junction 20. It can be appreciated that if the input and output impedances at the TEE-junction 20 are substantially the same as the impedance into receiver 14 and out of transmitter 11, a matching network 12 would be unnecessary as shown in FIG. 2B.

FIGS. 3A and 3B disclose alternative configurations of the antenna system 30. The matching network 12, 32 may be necessary to match the input and output impedances of port 23 of TEE 20 to antenna 31. It can be appreciated that a matching network may be unnecessary if the input and output impedances of port 23 of TEE 20 are substantially the same as antenna 31 (shown in FIG. 3B).

FIG. 4 shows schematically the Off-line signal interference reduction device connected to the first port 22. The Off-line SIRD 40 comprises a SIRD switch 41, an Off-line filtering system 42, and a main load 46 connected to a common reference. The Off-line filtering system 42 comprises a broadband power splitter 43, at least one filtering channel 44 and a combinet 45. The filtering channels include a plurality of filter switches $FS_{a1}$, $FS2_{a2}$, $FS_{a3}$, ..., $FS_{an}$, a plurality of filters, $F_{a1}$, $F_{a2}$, $F_{a3}$, ..., $F_{an}$, and a plurality of filter loads, $FL_{a1}$, $FL_{a2}$, $FL_{a3}$, ..., $FL_{an}$. Each filtering channel comprises a switch $FS_{an}$, a filter $F_{an}$, and a filtering load $FLan$ connected in series.

The SIRD switch 41 engages and disengages the Off-line SIRD 40 from the TEE 20 of the communication system 1. The filter switches $FS_{a1}$, $FS_{a2}$, $FS_{a3}$, ..., $FS_{an}$ engage the particular filters to the splitter 43. Depending on the power, speed switching, and system redundancy requirements, the SIRD switch 41 and the filter switches may be a combination of mechanical switches or PIN diodes.

The filters $FS_{a1}$, $FS_{a2}$, $FS_{a3}$, ..., $F_{an}$ are combinations of bandpass, low-pass, and high-pass filters. Active and passive components may be used for the filters. Furthermore, variable length cables between the splitter 43 and each filter $FS_{an}$ can be used to eliminate the anomalies associated with resonance and phase sensitivities of each filter.

The main load 46 and the individual filter loads $FL_{a1}$, $FL_{a2}$, $FL_{a3}$, ..., $FL_{an}$ comprise the dissipative load. The main load 46 may be, for example, a resistor. The filter loads may be combination of resistive, inductive and capacitive components.

In a transmitting operation, amplified spectra of signals having undesired and desired signals are sent from the transceiver system 10 to the TEE-junction 20. By engaging particular filtering channels 44 of the Off-line SIRD 40 that do not have the desired signals in their passband, the path through the Off-line SIRD would appear as a very high impedance to the desired signals, and the desired signals are passed unaltered to the antenna system 30. The Off-line SIRD would present a path to a main load 46 for the undesired signals at the TEE-junction 20. Thus, the undesired signals are dissipated in the dissipative load.

In a receiving operation, the antenna 31 receives the spectra of signals. By engaging particular filtering channels 44 of the Off-line SIRD 40 that do not have the desired signals in their passband, the path through the Off-line SIRD would appear as a very high impedance to the desired signals. The Off-line SIRD would present a path to a main load for any remaining undesired signals at the TEE-junction 20. The desired signals are passed unaltered to the matching network 12 and receiver 14, or alternatively, to the receiver 14 depending on whether a matching network 12 is necessary.

FIG. 5 is a schematic representation of a RF communication system having an Off-line SIRD 40 and an Interface system 60 including an In-line SIRD 50 and antenna system 30. The In-line SIRD 50 is coupled between the TEE-junction 20 and antenna system 30. The configuration of the In-line SIRD 50 is similar to the Off-line SIRD 40.

As shown in FIG. 6, the In-line SIRD comprises a first In-line SIRD switch 51, a second In-line SIRD switch 56, an In-line filtering system 52, and a signal line 57. The signal line 57 connects the first terminals 51a, 56a of the first and second In-line SIRD switches 51, 56. The In-line filtering system 52 is located between the second terminals 51b and 56b of the first and second In-line SIRD switches 51, 56. The switches 51, 56 selectively decouple the filtering system 52 from the TEE-junction 20 and antenna system 30 by coupling the signal line 57 to the TEE-junction and antenna system 30. The signal line 57 is necessary to bypass the filter system 52. For example, when operating as a receiver or when the power handling capability of the filters makes it impractical to incorporate the In-line filtering system 52, the filtering system 52 may be bypassed. Further, it can be appreciated that if the antenna impedance varies over frequency, components in the filtering channels of the In-line SIRD can be used to impedance match the antenna to the transceiver system.

The In-line filtering system 52 is very similar to the Off-line filtering system 42. The In-line filtering system comprises a broadband power splitter 53, a plurality of filtering channels, and a combiner 55. The broadband power splitter 53 and the combiner 55 are connected to the second terminals 51b, 56b of the first and second In-line SIRD switches 51, 56, respectively. The plurality of filtering channels 54 comprises a plurality of filter switches $FS_{b1}$, $FS_{b2}$, $FS_{b3}$, ..., $FS_{bn}$, a plurality of filters $F_{b1}$, $F_{b2}$, $F_{b3}$, ..., $FS_{bn}$, and a plurality of filter loads $FL_{b1}$, $FL_{b2}$, $FL_{b3}$, ..., $FL_{bn}$. Each filtering channel of the In-line SIRD comprises a switch $FS_{bn}$, a filter $F_{bn}$, and a filtering load $FL_{bn}$ connected in series. The components of the broadband power splitter, the switches, the filters, the filtering loads and the combiner are similar to the above-described components of the Off-line SIRD.

In a transmitting operation, spectra of signals having undesired and desired signals are sent from the transceiver system 10 to the TEE-junction 20. The amplified undesired signals are impedance matched to the dissipative load of the Off-line SIRD 40 and are therefore reduced while the amplified desired signals are impedance matched to the In-line SIRD 50 and the antenna system 30. By engaging particular filtering channels 44 of the Off-line SIRD that do not have the desired signals in their passband, the path to the Off-line SIRD would appear as a high impedance to the desired signals. The Off-line SIRD provides a shunt path to a main load 46 for the undesired signals at the TEE-junction 20. Thus, the undesired signals are dissipated in the dissipative load of the Off-line SIRD 40.

The desired signals are passed through the In-line SIRD by engaging those filtering channels 54 that are opposite in their frequency of operation to the filtering channels 44 of the Off-line SIRD. If the SIRD switches are engaged to pass the desired signals through the In-line SIRD, the desired signals are separated into a plurality of wide band outputs by the broadband power splitter 53. The signals are filtered through the filters $F_{b1}$, $F_{b2}$, $F_{b3}$, ..., $F_{bn}$ to eliminate the interferences, harmonics, intermodulations and spurious signals remaining in the desired signals. The combiner 55 combines the filtered wide band outputs to reform the desired signals. The desired signals are then passed to the antenna system 30 for transmission.

In a receiving operation, the antenna system 30 receives the spectra of signals. In a receiving mode, the In-line SIRD may be engaged as in transmit operation or, alternately, it may be bypassed by coupling the first and second In-line SIRD switches 51, 56 to the signal line 57. The filtering channels 44 that do not have the desired signals in their passband are engaged in the Off-line SIRD 40 and the path through the Off-line SIRD would appear as a very high impedance to the desired signals. Thus, any undesired signals remaining in the spectra of signals are dissipated in the dissipative load and the desired signals are passed to the transceiver system 20.

Both the Off-line and In-line signal interference reduction devices can be used in IF, voice, and data communication systems. The above embodiments are intended to be illustrative and not limiting. The specific characteristics of the components in a given communication system depend on the application and the characteristics of the amplifier, matching network and antenna systems. Furthermore, filter characteristics such as bandwidth and power handling capabilities determine the system configuration and the number of filters dictate the filtering resolution of the SIRD. Various modifications may be made without departing from the spirit and scope of the invention as defined in the appended claims.

What is claimed is:

1. A system for transmitting and receiving spectra of signals having undesired signals and desired signals comprising:

a transceiver system for at least one of a TEE-junction coupled to said transceiver system and having first and second ports, said undesired and desired signals being separated at said TEE-junction;

an OFF-line signal interference reduction device coupled to said first port, said Off-line signal interference reduction device receiving said undesired signals from said first port; and an Interface system coupled to said second port, wherein said Off-line signal interference reduction device comprises:

a signal interference reduction device switch, a first terminal of the signal interference reduction device coupled to said first port for selectively coupling said Off-line signal interference reduction device to said first port;

a main load coupled to a common reference for dissipating said undesired signals; and a filtering system having at least one filtering channel coupled to a second terminal of said signal interference reduction device and to said main load.

2. The system of claim 1 wherein said transceiver system comprises
   an amplifier for amplifying said spectra of signals; and
   a first matching network coupled between said amplifier and said TEE-junction.

3. The system of claim 1 wherein said transceiver system comprises
   an amplifier coupled to said Tee-junction for amplifying said spectra of signals.

4. The system of claim 1 wherein said filtering system comprises:
   a splitter coupled to said second terminal of said SIRD switch; and
   a combiner coupled to said main load, said at least one filtering channel being coupled between said splitter and said combiner.

5. The communication system of claim 4 wherein each of said at least one filtering channel comprises:
  a filter switch coupled to said splitter for selectively coupling said filter channel to said splitter;
  a filter load coupled to said combiner; and
  a filter coupled between said filter switch and said filter load.

6. The system of claim 5 wherein said filter comprises one of bandpass, band-reject, high-pass, and low-pass filters.

7. A system for transmitting and receiving spectra of signals having undesired signals and desired signals comprising:
  a transceiver system for at least one of receiving and transmitting signals;
  a TEE-junction coupled to said transceiver system and having first and second ports, said undesired and desired signals being separated at said TEE-junction; and
  an Interface system coupled to said second port;
  wherein said Interface system comprises:
  an In-line signal Interference reduction device coupled to said second port, and
  a signal input/output system coupled to said In-line signal interference reduction device; and
  wherein said In-line signal interference reduction device comprises:
  a filtering system,
  a first signal interference reduction device switch coupled to said second port,
  a second signal interference reduction device switch coupled to said signal input/output system, said filtering system coupled between said first and second signal interference reduction device switches, and
  a signal line coupled between said first and second signal interference reduction device switches, said switches being arranged to selectively decouple said In-line signal interference reduction device from the communication system.

8. The system of claim 7 wherein said antenna system comprises:
  a second matching network coupled to said In-line signal interference reduction device; and
  an antenna coupled to said second matching network for receiving said spectra of signals and for transmitting said desired signals.

9. The system of claim 7 wherein said antenna system comprises an antenna coupled to said In-line signal interference reduction device for transmitting said desired signals and receiving said spectra of signals.

10. The system of claim 7 wherein said filtering system comprises:
  a splitter coupled to said first SIRD switch;
  a combiner coupled to said second SIRD switch; and
  at least one filtering channel coupled between said splitter and said combiner.

11. The system of claim 10 wherein each of said at least one filtering channel comprises:
  a filter switch coupled to said splitter for selectively coupling said filter channel to said splitter;
  a filter load coupled to said combiner; and
  a filter coupled between said filter switch and said filter load.

12. An Off-line signal interference reduction device connected to a TEE-junction of a signal receiving system for shunting undesired signals comprising:
  a signal interference reduction device switch coupled to the TEE-junction for selectively engaging said Off-line signal interference reduction device;
  a main load coupled to a ground for dissipating said undesired signals; and
  a filtering system coupled between said signal interference reduction device switch and said main load.

13. The Off-line signal interference reduction device of claim 12 wherein said filtering system comprises:
  a splitter coupled to said signal interference reduction device switch;
  a combiner coupled to said main load; and
  at least one filtering channel coupled between said splitter and said main load.

14. The Off-line signal interference reduction device of claim 13 wherein each of said filtering channels comprises:
  a filter switch coupled to said splitter for selectively coupling said filter channel to said splitter;
  a filter load coupled to said combiner; and
  a filter coupled between said filter switch and said filter load.

15. The Off-line signal interference reduction device of claim 14 wherein said filter comprises one of bandpass, band-reject, high-pass, and low-pass filters.

16. An In-line signal interference reduction device coupled between a TEE-junction and a signal output system of a signal transmitting system for filtering desired signals comprising:
  a first signal interference reduction device switch having first and second terminals and coupled to the TEE-junction;
  a second signal interference reduction device switch having first and second terminals and coupled to the signal output system;
  a filtering system having a plurality of filtering channels connected between said first and second signal interference reduction device switches; and
  a signal line connected between said first terminals of said first and second signal interference reduction device switches, wherein said filtering system is connected between second terminals of said first and second signal interference reduction device switches, said first and second signal interference reduction device switches for selectively bypassing said filtering by coupling the TEE-junction and the signal output system through said signal line.

17. The signal interference reduction device of claim 16 wherein said filtering system comprises:
  a splitter coupled to said first signal interference reduction device switch; and
  a combiner coupled to said second signal interference reduction device switch, said plurality of filtering channels being coupled between sad splitter and said combiner.

18. The signal interference reduction device of claim 17 wherein each of said plurality of filtering channels comprises:
  a filter switch coupled to said splitter for selectively coupling said filter channel to said splitter;
  a filter load coupled to said combiner; and
  a filter coupled between said filter switch and said filter load.

19. The signal interference reduction device of claim 18 wherein said filter comprises one of bandpass, band-reject high-pass, and low-pass filters.

20. A method of reducing and eliminating undesired signals from desired signals from a signal source in signal transceiving systems comprising:
- separating said undesired and desired signals into a desired impedance path and an undesired impedance path; and
- dissipating said undesired signals in a Off-line signal interference reduction device, wherein the dissipating step comprises:
- selectively coupling the Off-line signal interference reduction device to the undesired impedance path;
- selectively passing the undesired signals to a load when the Off-line signal interference reduction device is coupled to the undesired impedance path; and
- dissipating the selectively passed undesired signals in a main load.

21. The method of claim 20, wherein the step of selectively passing the undesired signals comprises:
- splitting the undesired and desired signals into a plurality of signal components;
- providing the plurality of signal components to a plurality of filtering channels, wherein undesired signal components pass through corresponding ones of the plurality of filtering channels and desired signal components are not passed by the plurality of filtering channels; and
- combining the undesired signal components passed by the plurality of filtering channels.

22. The method of claim 21, wherein each one of the filtering channels passes undesired frequency components and includes a matching dissipative load.

23. The method of claim 20, further comprising the steps of:
- selectively coupling the desired signal path to one of a desired impedance path and an in-line signal interference reduction device, outputs of each of the desired impedance path and in-line signal interfering reduction device connected to a downstream desired signal path;
- selectively passing the desired signals to the downstream path when the in line signal interference reduction device is selected; and
- dissipating the undesired signals in the off-line signal interference reduction device when the off-line signal interference reduction device is selected.

24. The method of claim 23, wherein the desired impedance path is one of a high impedance path, a low impedance path and a matched impedance path, an impedance of the desired impedance path determined relative to the signal source.

25. The method of claim 23, wherein:
- the step of selectively passing the desired signals comprises the steps of:
- splitting the undesired and desired signals into a plurality of signal components; and
- providing the plurality of signal components to a plurality of filtering channels, wherein desired signal components pass through corresponding ones of the plurality of filtering channels and undesired signal components are not passed by the plurality of filtering channels; and
- combining the passed desired signal components passed by the plurality of filtering channels.

26. The method of claim 25, wherein each one of the filtering channels passes desired frequency components and includes an impedance matching load.

27. The signal transmitting and receiving system of claim 7, wherein the signal input/output system comprises an antenna.

28. The signal transmitting and receiving system of claim 16, wherein the signal output system comprises an antenna.

* * * * *